US007062629B2

(12) United States Patent
Shimada et al.

(10) Patent No.: US 7,062,629 B2
(45) Date of Patent: *Jun. 13, 2006

(54) APPARATUS AND METHOD FOR PARTITIONING AND MANAGING SUBSYSTEM LOGICS

(75) Inventors: Akinobu Shimada, Chigasaki (JP); Hideo Tabuchi, Odawara (JP); Yasuaki Nakamura, Fujisawa (JP); Kozue Fujii, Odawara (JP); Shotaro Ohno, Yamato (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/057,755

(22) Filed: Feb. 15, 2005

(65) Prior Publication Data

US 2005/0149676 A1 Jul. 7, 2005

Related U.S. Application Data

(63) Continuation of application No. 10/729,925, filed on Dec. 9, 2003.

(30) Foreign Application Priority Data

Aug. 25, 2003 (JP) ............................ 2003-300363

(51) Int. Cl.
*G06F 12/00* (2006.01)

(52) U.S. Cl. .................... 711/170; 709/229; 714/707; 715/779

(58) Field of Classification Search .................. None
See application file for complete search history.

(56) References Cited

U.S. PATENT DOCUMENTS

| 5,568,629 A | 10/1996 | Gentry et al. |
| 5,657,470 A | 8/1997 | Fisherman et al. |
| 5,829,053 A | 10/1998 | Smith et al. |
| 5,973,690 A | 10/1999 | Ofer |
| 6,021,481 A | 2/2000 | Eickemeyer et al. |

(Continued)

FOREIGN PATENT DOCUMENTS

EP  1321848  12/2002

(Continued)

OTHER PUBLICATIONS

Swartz, K., "Multiple Volumes and Multiple RAID Groups on NetApp Fliers", Network Applicance Report TR 3027, no date, from Google cache online.

(Continued)

*Primary Examiner*—Kevin L. Ellis
*Assistant Examiner*—Duc T Doan
(74) *Attorney, Agent, or Firm*—Mattingly, Stanger, Malur & Brundidge, P.C.

(57) ABSTRACT

A subsystem logics partitioning and managing apparatus comprises a recognition unit for recognizing logical and physical resources that constitute a subsystem a partition definition table in which the logical and physical resources in the subsystem are assigned for each user at an interface level at which a storage configuration can be referenced by a storage management program an account table in which an account is set for each user-specific partition defined in the partition definition table a receiving unit for receiving a user account transmitted from an information processing unit and checking the received user account against the account table, to recognize a partition that corresponds to the user and a unit for outputting, at a GUI level, logical resources and physical resources that are contained in the recognized partition to an output interface as a resource configuration in the subsystem.

17 Claims, 9 Drawing Sheets

U.S. PATENT DOCUMENTS

| | | | |
|---|---|---|---|
| 6,148,368 A | 11/2000 | DeKoning | |
| 6,247,109 B1 | 6/2001 | Kleinsorge et al. | |
| 6,275,824 B1 | 8/2001 | O'Flaherty et al. | |
| 6,275,825 B1 | 8/2001 | Kobayashi et al. | |
| 6,275,898 B1 | 8/2001 | DeKoning | |
| 6,279,046 B1 | 8/2001 | Armstrong et al. | |
| 6,289,398 B1 | 9/2001 | Stallmo et al. | |
| 6,330,653 B1 | 12/2001 | Murray et al. | |
| 6,341,331 B1 | 1/2002 | McNutt | |
| 6,343,324 B1 * | 1/2002 | Hubis et al. | 709/229 |
| 6,347,358 B1 | 2/2002 | Kuwata | |
| 6,425,049 B1 | 7/2002 | Yamamoto et al. | |
| 6,438,671 B1 | 8/2002 | Doing et al. | |
| 6,457,102 B1 | 9/2002 | Lambright et al. | |
| 6,484,173 B1 | 11/2002 | O'Hare et al. | |
| 6,484,245 B1 | 11/2002 | Sanada | |
| 6,502,162 B1 | 12/2002 | Blumenau et al. | |
| 6,502,193 B1 | 12/2002 | Barber | |
| 6,507,896 B1 | 1/2003 | Sanada | |
| 6,507,905 B1 | 1/2003 | Hubacher et al. | |
| 6,519,679 B1 | 2/2003 | Devireddy et al. | |
| 6,523,096 B1 | 2/2003 | Sanada | |
| 6,542,926 B1 | 4/2003 | Zalewski et al. | |
| 6,542,961 B1 | 4/2003 | Matsunami | |
| 6,594,775 B1 | 7/2003 | Fair | |
| 6,606,695 B1 | 8/2003 | Kamano | |
| 6,609,180 B1 | 8/2003 | Sanada | |
| 6,615,324 B1 | 9/2003 | Fernald | |
| 6,665,786 B1 | 12/2003 | McMichael et al. | |
| 6,684,209 B1 | 1/2004 | Ito et al. | |
| 6,690,400 B1 * | 2/2004 | Moayyad et al. | 715/779 |
| 6,691,209 B1 | 2/2004 | O'Connell | |
| 6,701,410 B1 | 3/2004 | Matsunami | |
| 6,701,411 B1 | 3/2004 | Matsunami | |
| 6,715,031 B1 | 3/2004 | Camble et al. | |
| 6,718,481 B1 | 4/2004 | Fair | |
| 6,728,836 B1 | 4/2004 | Lambright et al. | |
| 6,728,844 B1 | 4/2004 | Sanada | |
| 6,742,034 B1 | 5/2004 | Schubert et al. | |
| 6,742,090 B1 | 5/2004 | Sanada | |
| 6,772,287 B1 | 8/2004 | Uchiyama et al. | |
| 6,839,796 B1 | 1/2005 | Dawson et al. | |
| 6,851,022 B1 | 2/2005 | Ikeuchi et al. | |
| 6,851,029 B1 | 2/2005 | Matsunami | |
| 6,865,157 B1 | 3/2005 | Scott | |
| 6,877,073 B1 | 4/2005 | Sanada | |
| 6,898,672 B1 | 5/2005 | Lambright et al. | |
| 6,904,470 B1 | 6/2005 | Ofer | |
| 6,910,102 B1 | 6/2005 | Matsunami | |
| 2001/0008010 A1 | 7/2001 | Sanada | |
| 2001/0011332 A1 | 8/2001 | Sanada | |
| 2001/0011333 A1 | 8/2001 | Sanada | |
| 2001/0047463 A1 | 11/2001 | Kamano | |
| 2001/0047487 A1 | 11/2001 | Harris et al. | |
| 2002/0010843 A1 | 1/2002 | Sanada | |
| 2002/0016812 A1 | 2/2002 | Uchishiba et al. | |
| 2002/0052914 A1 | 5/2002 | Zalewski et al. | |
| 2002/0065982 A1 | 5/2002 | Colligan | |
| 2002/0083285 A1 | 6/2002 | Sanada | |
| 2002/0091898 A1 | 7/2002 | Matsunami | |
| 2002/0095549 A1 | 7/2002 | Matsunami | |
| 2002/0095602 A1 | 7/2002 | Pherson et al. | |
| 2002/0099837 A1 | 7/2002 | Oe et al. | |
| 2002/0099914 A1 | 7/2002 | Matsunami et al. | |
| 2002/0103913 A1 | 8/2002 | Tawil et al. | |
| 2002/0104008 A1 | 8/2002 | Cochran et al. | |
| 2002/0107810 A1 | 8/2002 | Nishio et al. | |
| 2002/0124040 A1 | 9/2002 | Foster et al. | |
| 2002/0161891 A1 | 10/2002 | Higuchi et al. | |
| 2003/0009648 A1 | 1/2003 | Doing et al. | |
| 2003/0014600 A1 | 1/2003 | Ito et al. | |
| 2003/0023868 A1 | 1/2003 | Parent | |
| 2003/0055933 A1 | 3/2003 | Ishizaki et al. | |
| 2003/0055972 A1 | 3/2003 | Fuller et al. | |
| 2003/0084241 A1 | 5/2003 | Lubbers et al. | |
| 2003/0097393 A1 | 5/2003 | Kawamoto et al. | |
| 2003/0115218 A1 * | 6/2003 | Bobbit et al. | 707/200 |
| 2003/0115282 A1 | 6/2003 | Rose | |
| 2003/0115434 A1 | 6/2003 | Mahalingham et al. | |
| 2003/0115438 A1 | 6/2003 | Mahalingam et al. | |
| 2003/0115447 A1 | 6/2003 | Pham et al. | |
| 2003/0120743 A1 | 6/2003 | Coatney | |
| 2003/0177176 A1 | 9/2003 | Hirschfeld et al. | |
| 2003/0182501 A1 | 9/2003 | George et al. | |
| 2003/0191910 A1 | 10/2003 | Matsunami | |
| 2003/0196055 A1 | 10/2003 | Kamano | |
| 2003/0225934 A1 | 12/2003 | Kaji | |
| 2003/0229698 A1 | 12/2003 | Furahashi | |
| 2004/0003063 A1 | 1/2004 | Ashok et al. | |
| 2004/0010563 A1 | 1/2004 | Forte et al. | |
| 2004/0049564 A1 | 3/2004 | Ng et al. | |
| 2004/0064729 A1 | 4/2004 | Yellepeddy | |
| 2004/0088417 A1 | 5/2004 | Bober et al. | |
| 2004/0111557 A1 | 6/2004 | Nakatani et al. | |
| 2004/0111596 A1 | 6/2004 | Rawson, III | |
| 2004/0139168 A1 | 7/2004 | Tanaka et al. | |
| 2004/0153605 A1 | 8/2004 | Nakamura | |
| 2004/0153710 A1 | 8/2004 | Fair | |
| 2004/0158673 A1 | 8/2004 | Matsunami | |
| 2004/0163028 A1 * | 8/2004 | Olarig | 714/767 |
| 2004/0168033 A1 | 8/2004 | Sanada | |
| 2004/0181589 A1 | 9/2004 | Suleiman | |
| 2004/0193803 A1 | 9/2004 | Mogi et al. | |
| 2004/0199736 A1 | 10/2004 | Kamano | |
| 2004/0210591 A1 | 10/2004 | Hirschfeld et al. | |
| 2004/0212511 A1 | 10/2004 | Ahrens et al. | |
| 2004/0215859 A1 | 10/2004 | Armstrong et al. | |
| 2004/0215860 A1 | 10/2004 | Armstrong et al. | |
| 2004/0215915 A1 | 10/2004 | Block et al. | |
| 2005/0005064 A1 | 1/2005 | Ito et al. | |
| 2005/0010722 A1 | 1/2005 | Chen | |
| 2005/0015546 A1 | 1/2005 | Zohar et al. | |
| 2005/0021727 A1 | 1/2005 | Matsunami et al. | |
| 2005/0033914 A1 | 2/2005 | Matsunami | |
| 2005/0050085 A1 | 3/2005 | Shimada et al. | |
| 2005/0071446 A1 | 3/2005 | Graham et al. | |
| 2005/0166074 A1 | 7/2005 | Hack | |
| 2005/0172052 A1 | 8/2005 | Sanada | |

FOREIGN PATENT DOCUMENTS

| | | |
|---|---|---|
| JP | 2002-0149599 | 5/1992 |
| JP | 5-128002 | 5/1993 |
| JP | 2003-30053 | 1/2002 |
| JP | 2002-230189 | 8/2002 |
| JP | 2003-157177 | 5/2003 |

OTHER PUBLICATIONS

Rangel, G., "Hitachi Freedom Storage: Thunder 9200 Architecture and Performance Configuration Guidelines", Hitachi Data Systems, 2001, pp. 1-27.

"Freedom Storage Lighting 990 V Series", User and Reference Guide, Hitachi Data Systems Corp., 2002, pp. iii-124.

Buck, A.L. et al, "The Storage Server as Virtual Volume Manager", IEEE Comput. Soc., Apr. 1993, USA 26-29, pp. 79-86.

Gelb, J.P., "System-Managed Storage", IBM Systems Journal, vol. 28, No. 1, Jan. 1989, pp. 77-103.

Kaczmarski, M. et al, "Beyond Backup Toward Storage Management", IBM Systems Journal, vol. 42, No. 2, 2003, pp. 322-337.

* cited by examiner

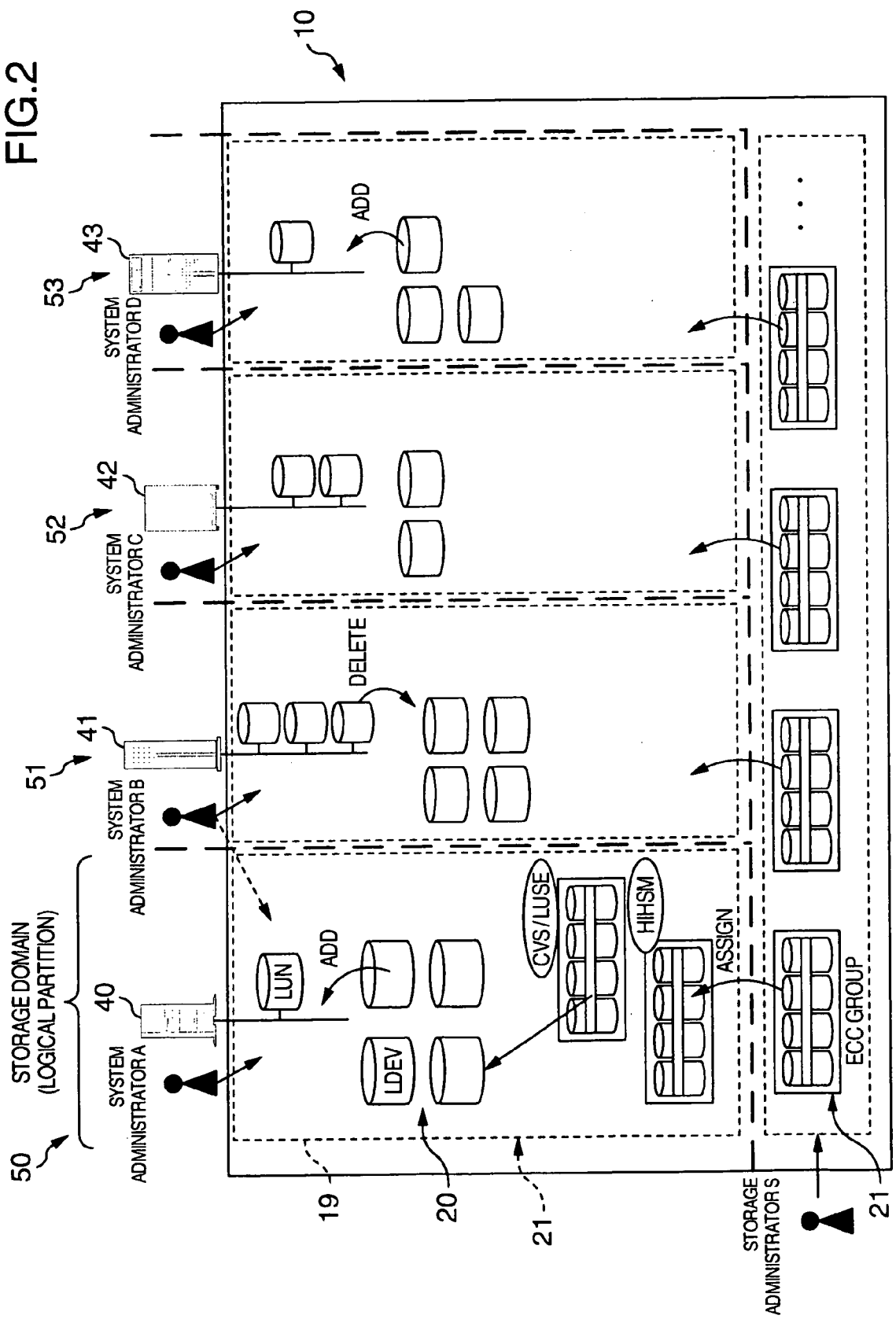

GUI LEVEL

API LEVEL

DISK ARRAY
DEVICE LEVEL

PRESENT INVENTION

GUI LEVEL

API LEVEL

DISK ARRAY
DEVICE LEVEL

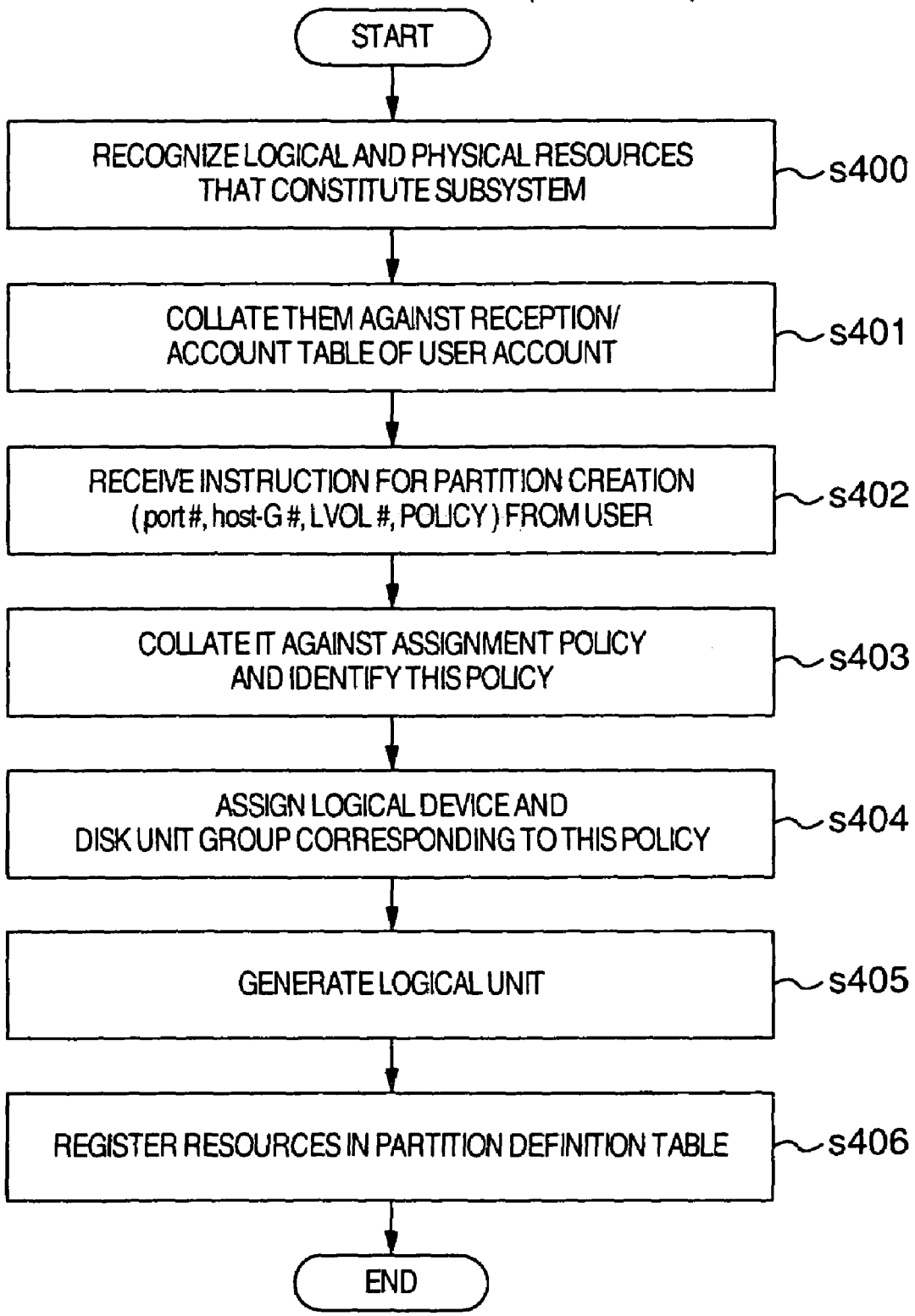

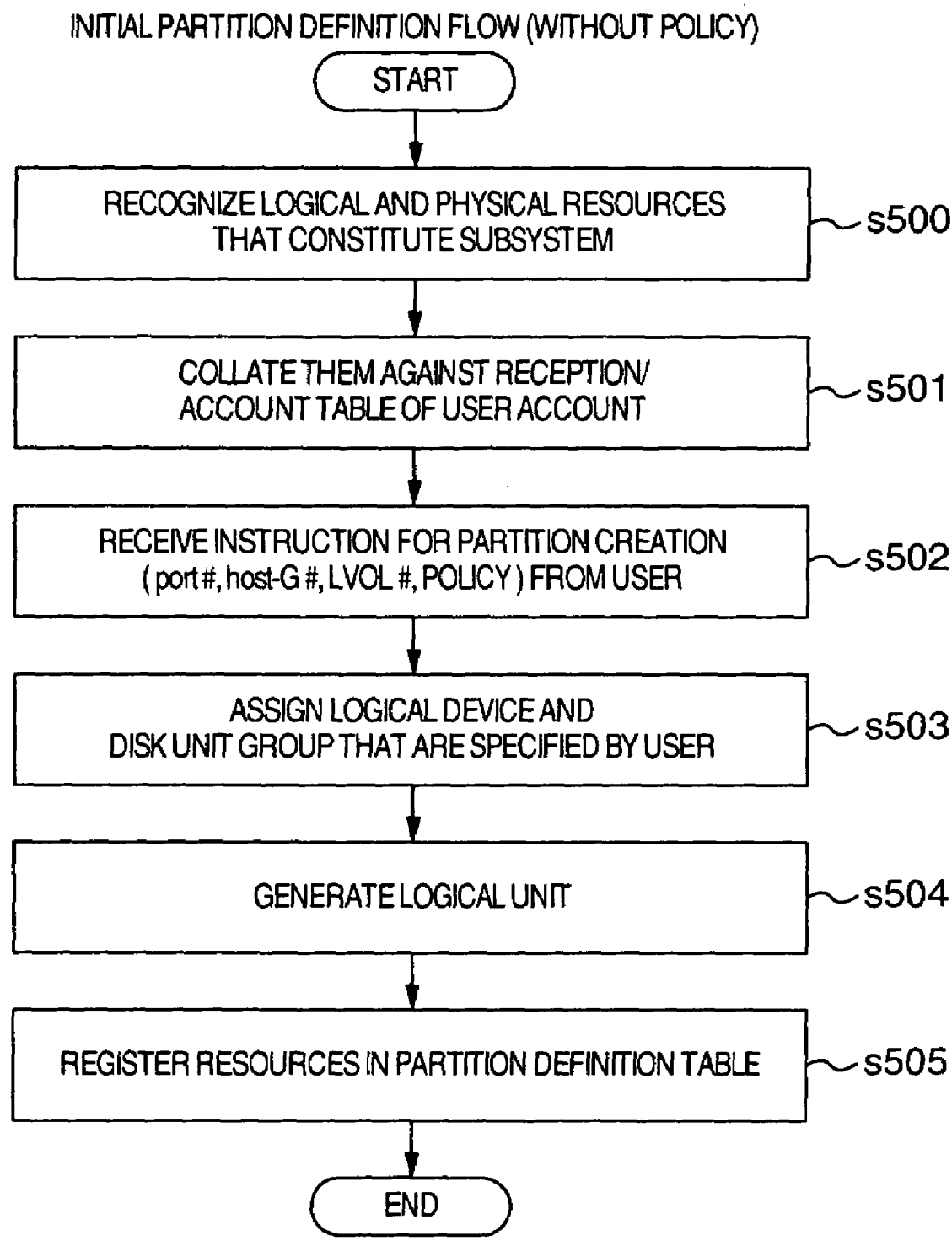

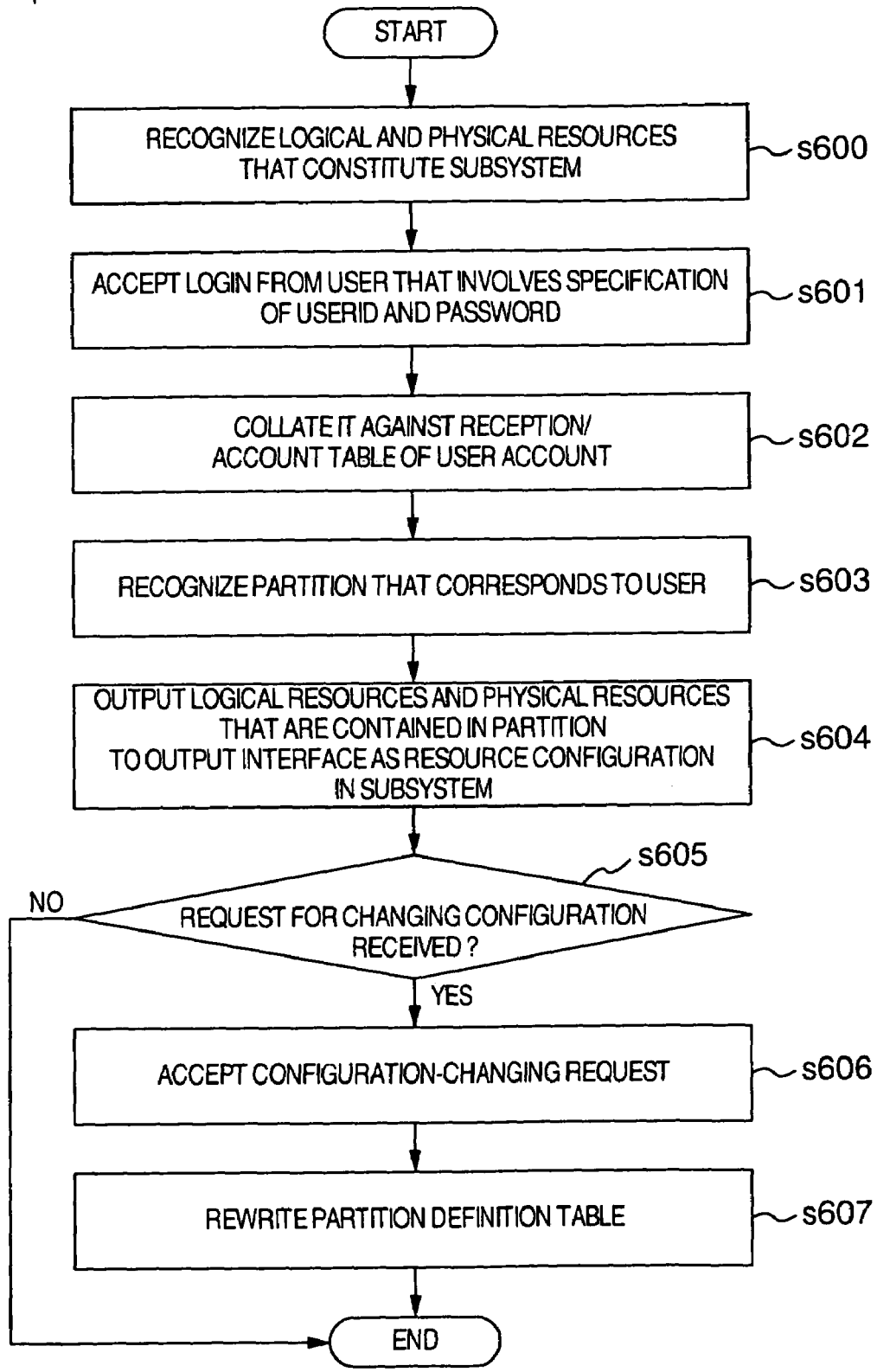

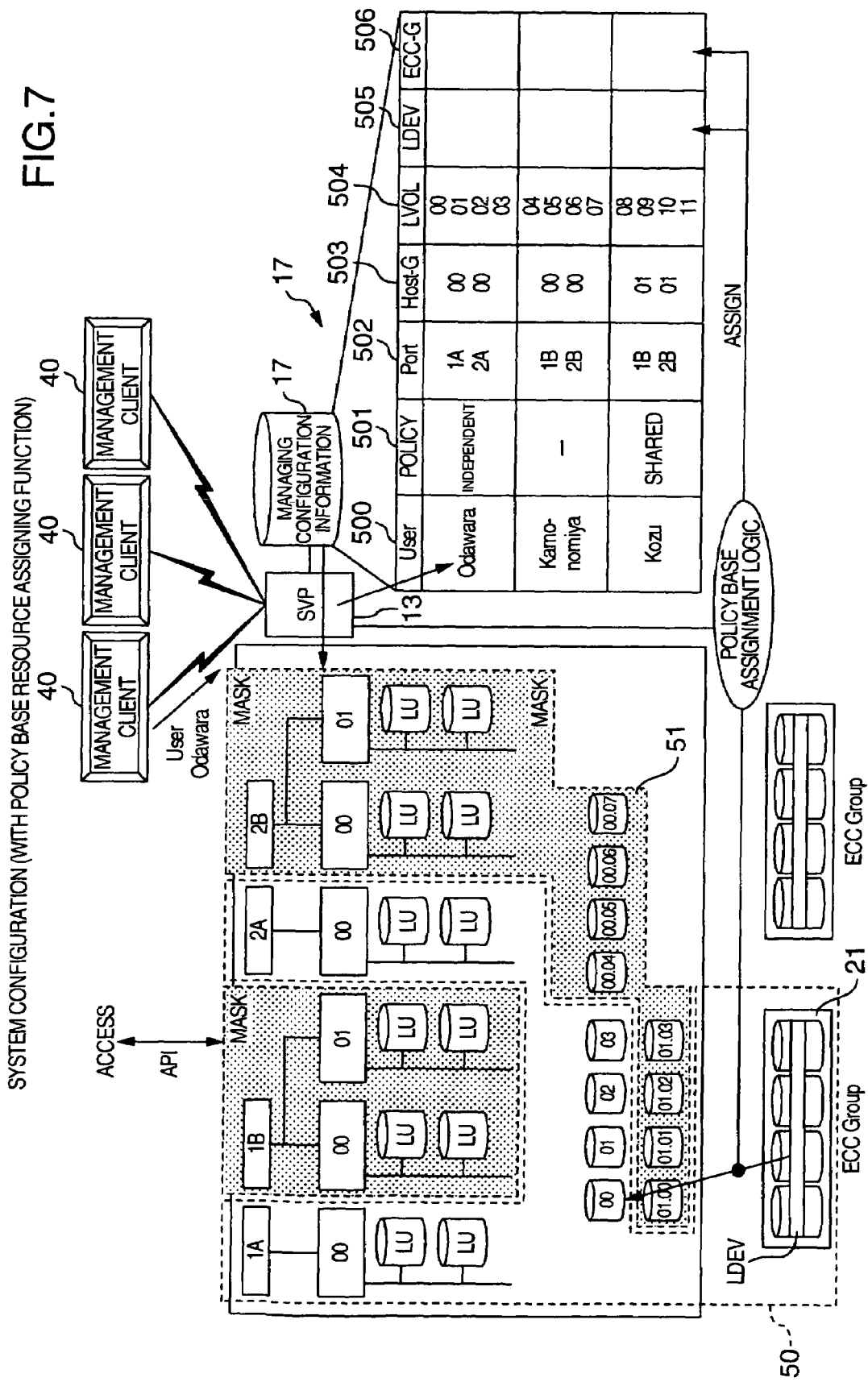

FIG.9

| Uesr | ID | Password |
|---|---|---|
| Odawara | #01—1001 | p12&5%70 |
| Kamonomiya | #01—1002 | j&12%02 |
| Kozu | #01—1003 | 12@%$p57 |
| ⋮ | ⋮ | ⋮ |

601, 602, 603, 600

APPARATUS AND METHOD FOR PARTITIONING AND MANAGING SUBSYSTEM LOGICS

CROSS-REFERENCE TO RELATED APPLICATION

This is a continuation application of U.S. Ser. No. 10/729,925, filed Dec. 9, 2003. Japanese Patent Application No. 2003-300363 on which the present application is based and which was applied on Aug. 25, 2003 is herein incorporated by reference.

BACKGROUND OF THE INVENTION

1. Field of the Invention

The present invention relates to an apparatus, method, and program for partitioning and managing logics which are present in a subsystem, and a recording medium for recording the program.

2. Description of the Related Art

A storage subsystem is proposed which is expected to be accessed from a variety of types of computers and which has a port to which an interface for connecting to a plurality of computers can be applied, a logical unit (LU) which can be accessed from the computers via said port, one or a plurality of storage devices for storing data which is stored in said logical unit, and a storage control device for conducting read/write control on the storage devices in order to realize security for each logical unit while effectively utilizing system resources in a conventional Logical Unit Number (LUN) security function. The computers accessing the logical unit are grouped into groups in such a manner that the computers can overlap each other. Each of the groups is assigned one or a plurality of logical units, and a management table is provided which correlates the assigned logical units and storage regions of the storage devices in such a manner that they can overlap each other.

On the other hand, the increasing storage capacity of a storage system has prompted large-scale storage consolidation. With storage consolidation, in a subsystem, there exist in a mixed manner a plurality of data belonging to a plurality of systems/applications. However, a security function in an aspect of storage management involved in storage consolidation has not sufficiently been provided by a GUI-level masking technology or conventional technology that provides security functions for data access itself.

That is, according to the conventional GUI-level masking etc., resources of upper storage management software are not partitioned on an interface which is adapted to instruct an actual storage to change a configuration. This is a problem. Therefore, such an issue is left unsolved that by using this interface, the configuration can be changed arbitrarily irrespective of a partitioning unit on a GUI etc.

Further, conventionally, partitioning of resources to such an extent that the upper storage management software can recognize (at a logical-volume level) is possible, whereas partitioning of physical resources that cannot be recognized by the management software (e.g., at an HDD level) has been impossible. Furthermore, even in the case of this partitioning at the logical-volume level, it cannot be known to which physical resources the logical volumes are allocated, so that some of the resources, even if partitioned as described above, may be common physically in some cases, which remains as a problem in performance or security.

Therefore, in a case where partitioning of logics of a subsystem in which storage consolidation has been performed is managed according to the conventional method, there is a possibility that an administrator may mistakenly perform an operation such as addition/deletion even to a region of other users, administrators and companies in relation to processing such as addition/deletion because such processing can be performed on an LU by configuration changing functions of an RAID. This may lead to system panic or user data destruction.

SUMMARY OF THE INVENTION

Therefore, to accommodate storage consolidation and allow some of the configuration changing functions of an RAID for multiple administrators, in view of the above problems, the storage system and the storage management software need to have a function to guard against configuration changing of unauthorized area system area from an administrator other than the system area which is assigned for the administrator.

In view of such a background, the present invention has been made and it is an object of the present invention to provide a subsystem logics partitioning and managing apparatus, method, and program for enabling configuration changing functions of an RAID within a predetermined limit, and a recording medium for recording the program.

For this end, a subsystem logics partitioning and managing apparatus according to one feature of the present invention comprises:

means for recognizing logical resources and physical resources that constitute a subsystem;

a partition definition table in which logical and physical resources in said subsystem are assigned for each user at an interface level at which a storage configuration can be referenced by a storage management program;

an account table in which a partition-specific account is set for each user defined in said partition definition table;

means for receiving a user account transmitted from an information processing unit and collating the received user account to said account table to thereby recognize a partition corresponding to said user; and means for outputting logical resources and physical resources that are included in said recognized partition to an output interface as a resource configuration in said subsystem.

The subsystem logics partitioning and managing apparatus comprises means for outputting, at a GUI level, logical resources and physical resources that are contained in said partition to an output interface as a resource configuration in said subsystem.

The subsystem logics partitioning and managing apparatus comprises means for accepting from the information processing unit a request for changing a configuration of said output logical resources or physical resources and changing said configuration of said logical resources or said physical resources in said partition definition table.

Resources to be assigned for each user in said partition definition table include a port, a logical unit, a logical device indicative of a logical storage region assigned to said logical unit, and a disk unit group having a disk unit and a parity bit-use disk unit which stores data recovery information of said disk unit.

The subsystem logics partitioning and managing apparatus comprises means for collating a requested specification of a logical unit accepted from an information processing unit to an assignment policy for said logical device and said disk unit group that are defined for each user, to perform assignment of a logical device and a disk unit group in accordance with said policy, thereby generating a logical unit.

The assignment policy comprises:

a first policy for selecting said logical device from a disk unit group to which no other partitions are assigned and in which no such disk unit group is present that control on input/output operations to disk units is conducted via the same adapter, to generate a logical unit;

a second policy for selecting said logical device from a disk unit group to which no other partitions are assigned, to generate a logical unit; and a third policy for selecting said logical device from a disk unit group to which no other partitions that correspond to said first and second policies are assigned, to generate a logical unit.

Furthermore, resources to be assigned for each user include a cache.

According to another feature of the present invention there is provided a method for partitioning and managing logics in a subsystem which comprises a partition definition table in which logical resources and physical resources in said subsystem are assigned for each user at an interface level at which a computer can reference a storage configuration by using a storage management program and an account table in which a partition-specific account is set for each user that is defined in said partition definition table, said method comprising the steps of:

recognizing said logical and physical resources that constitute said subsystem;

receiving an account of a user transmitted from an information-processing device and collating the received user account to said account table, to recognize a partition corresponding to said user; and outputting logical and physical resources contained in said recognized partition to an output interface as a resource configuration in said subsystem.

According to a further feature of the present invention there is provided a subsystem logics partitioning and managing program for causing a computer capable of utilizing a partition definition table in which logical resources and physical resources in a subsystem are assigned for each user at an interface level at which a storage configuration can be referenced by using a storage management program and an account table in which a partition-specific account is set for each user that is defined in said partition definition table to perform a method for partitioning and managing logics of said subsystem, said program comprising the steps of:

recognizing said logical and physical resources that constitute said subsystem;

receiving an account of a user transmitted from an information-processing device and collating the received user account to against said account table, to recognize a partition corresponding to said user; and outputting logical and physical resources contained in said recognized partition to an output interface as a resource configuration in said subsystem. This program is comprised of codes for performing said steps.

According to a still further feature of the present invention there is provided a computer-readable recording medium for recording said subsystem logics partitioning and managing program.

The other problems and the corresponding solutions disclosed in the present application will be made clear by description of embodiments of the present invention and drawings.

According to the present invention, the configuration changing functions of the RAID can be released within a predetermined range.

BRIEF DESCRIPTION OF THE DRAWINGS

Other objects, features and advantages of the present invention will now become apparent from the description of the embodiments of the invention in conjunction with the accompanying drawings.

FIG. 2 is an illustration for showing a use case image according to the present embodiment.

FIG. 4 is a flowchart for showing an initial partition definition flow (with a policy) according to the present embodiment.

FIG. 5 is a flowchart for showing the initial partition definition flow (without policy) according to the present embodiment.

FIG. 6 is a flowchart for showing a configuration referencing/updating flow according to the present embodiment.

FIG. 7 is an illustration for showing a system configuration (with a policy base resource assigning function) and a partition definition table.

FIG. 9 is an illustration for showing one example of an account table.

DETAILED DESCRIPTION OF THE EMBODIMENTS

System Configuration

Figure 1:
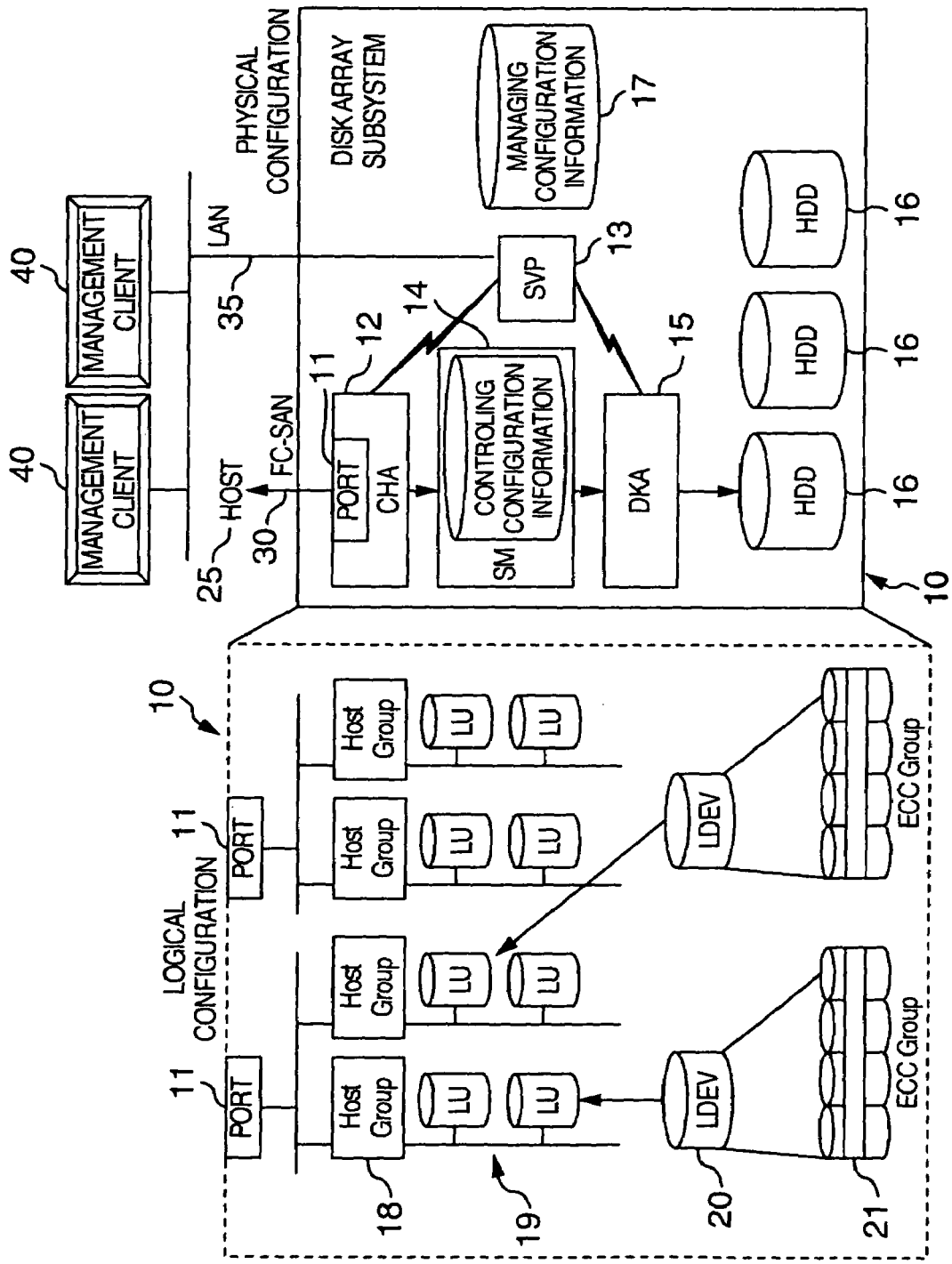
FIG. 1 is an illustration for showing a configuration of a storage system according to an embodiment of the present invention.

FIG. 1 shows a configuration of a storage system according to the present embodiment. A subsystem 10 and a host 25 are interconnected via an interface 30 (hereinafter referred to as fibre channel 30) such as, for example, an SCSI or a fibre channel. As one example of an information processing unit, the host 25 is, for example, an open-system type computer and can be assumed to be a personal computer or workstation in which an open-system type operating system (OS) operates. The subsystem 10 comprises a plurality of ports 11 for connection with ports of the fibre channel 30, a channel adapter (CHA) 12 for controlling a cache and data transfer, a service processor 13 (here referred to as SVP), a shared memory 14 for storing configuration information for use in control, a disk adapter (here referred to as DKA) 15 for controlling input/output operations to be performed to a storage device 16 such as an HDD, and the storage device 16.

Further, as described above, not in a physical configuration but in a logical configuration, the subsystem 10 comprises the ports 11, a host group 18 (here referred to as Host Group) assigned to the port 11, a logical unit 19 (hereinafter referred to as LU), a logical device 20 (hereinafter referred to as LDEV), and a disk unit group 21 (here referred to as ECC Group).

It is to be noted that a storage region of the storage system which is provided to the LU19 is managed in units of the LDEV20 (Logical Device). The LDEV20 is a logical volume includes a part of some disk units that compose a disk unit group of the disk array. The host 25 specifies storage regions to be provided by the LDEV20, in units of said LU19. The LUs19 are each given a Logical Unit Number (LUN), which is a unique identifier. At the host 25, the LUN can be, for example, a drive name or a device file name.

Further, said disk unit group 21 is comprised of a disk unit and a parity bit-use disk unit for storing data recovery information of this disk unit, which disk unit group 21 itself constitutes the LDEV20.

A management client 40 performs input/output operations to this subsystem 10 through a network 35 such as an LAN and performs management processing. This management client 40 may be referred to as an input interface that permits an administrator (hereinafter referred to as user) of logical/physical resources in the subsystem 10 which are partitioned and managed by a method according to the present invention to reference a configuration of these resources or request for changing the configuration. This management client 40 can have access through the network 35 to a managing configuration information (partition definition table) 17 of the service processor 13, and reference only a configuration region of predetermined resources defined for the user and change it.

FIG. 2 is an illustration for showing a use case image according to the present embodiment. By applying a subsystem logics partitioning and managing method according to the present invention, even in the subsystem 10 in which a large-scale storage consolidation has been performed, data belonging to a plurality of systems/applications present in a mixed manner are partitioned for each of said users so that none of said users can violate a boundary between partitions.

That is, in contrast to, for example, a conventional GUI-level masking technique etc., resources of storage management software are partitioned on an interface provided for instructing an actual storage to change a configuration (which interface is supposed to be an application program interface (API)). Therefore, even if this interface is utilized to place access from the management client 40 to a partition 50 in the subsystem 10, no contradiction occurs between a partitioning unit returned from the service processor 13 to this management client 40 and a range within which the configuration can be changed.

Figure 3A:
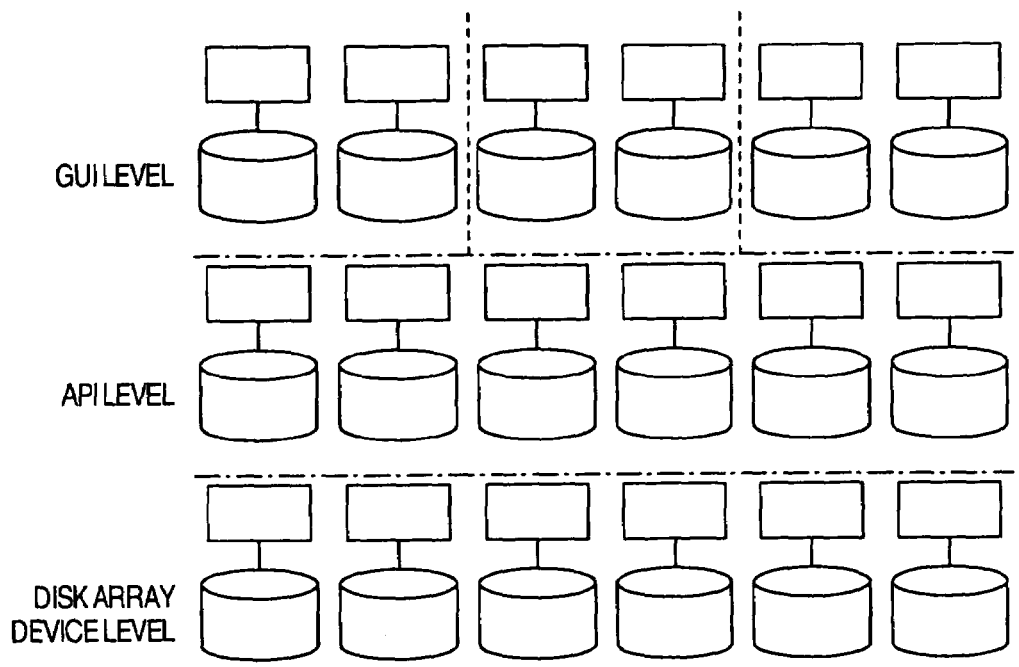
FIG. 3A is an illustration for showing a relationship among a disk array device, an API, and a GUI according to a conventional example.
Figure 3B:
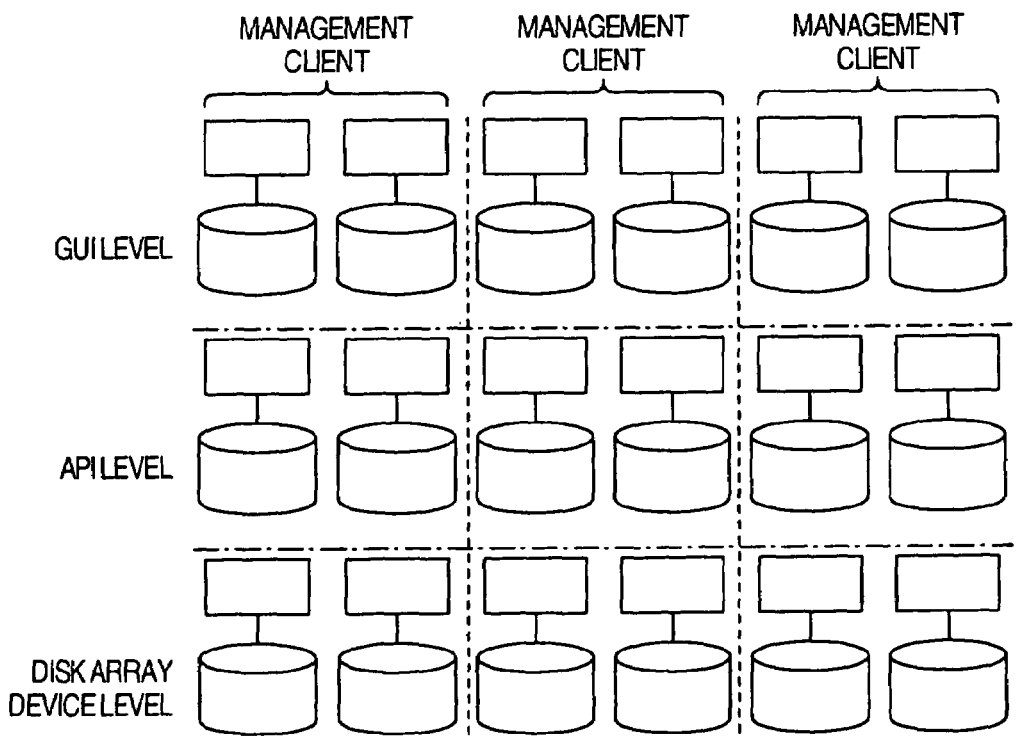
FIG. 3B is an illustration for showing the relationship among a disk array device, an API, and a GUI according to the present embodiment.

For example, even if certain access to the partition 50 through the management client 40 is normal, access to any one of the other partitions 51–53 is not permitted. Further, GUI display about the other partitions is not output. Alternatively, even if GUI display is given also about other partitions, changing etc. of the resource configuration is not accepted. In this case, a relationship among a display, the API, and the GUI is such as shown in FIG. 3. Partitioning processing by the conventional technologies has been realized at a GUI level, to enable viewing or operating even a configuration of all of the resources at an API level. However, according to the present invention, the user is permitted to perform viewing or a variety of operations only to a resource configuration at the GUI level, so that even a trial is made to view or change the resource configuration at, for example, the API level, only a configuration of the resources assigned to this user is presented from the beginning. That is, partitioning is established even at the API level.

A storage manager managing the subsystem 10 integrally assigns the disk unit group 21 (in a logical configuration) that constitutes a partition for each of said users from the disk unit group 21 (in a physical configuration) included in the subsystem 10. In this case, the service processor 13 can perform this processing by applying an internal hierarchy control function (hereafter referred to as HIHSM) for moving/rearranging data to an optimal disk drive in accordance with access properties in the subsystem in which there are in a mixed manner a plurality of disk drives having different properties such as performance and a capacity.

Further, by applying a function (hereafter referred to as CVS) for creating a logical unit having an arbitrary size, a disk capacity can be utilized efficiently. Furthermore, by applying a function (hereafter referred to as LUSE) for combining a plurality of standard logical units to create a mass-capacity LU, it is possible to provide the logical unit 19 having a huge size to the host, thus accommodating a large-scale application.

It is to be noted that by further applying a method according to the present invention to a subsystem to which conventionally proposed LUN security has been applied, in addition to a LUN security function for enabling setting an accessible host for each logical unit, such a function can also be provided as to correlate resource configuration display and a configuration changing permission/rejection scope for each of the users in the subsystem, which is preferable. Moreover, it is possible also to place access restrictions on a request for referencing/changing of the resource configuration at an API level, thus further improving the security.

Description of Processing

Description will be made of an actual procedure for performing subsystem logics partitioning and managing method according to an embodiment of the present invention. It is to be noted that various operations corresponding to the subsystem logics partitioning and managing method described below are realized by a program which is utilized by the service processor 14, which program is comprised of codes which are used to perform the various operations described below.

FIG. 4 is a flowchart for showing an initial partition definition flow (with a policy) according to an embodiment of the present embodiment. First, initial partitioning to be performed in response to a request sent from the user is described. The service processor 14 is supposed to have recognized logical and physical resources that constitute the subsystem 10, beforehand. Information of this configuration is stored in the managing configuration information 17 (s400). This configuration information 17 provides a definition table in which the logical resources and the physical resources in the subsystem are assigned for each of the users at an interface level at which a storage configuration can be referenced by the storage management program, that is, an API level.

In a partition definition table in FIG. 7 showing a system configuration (with a policy base resource assigning function) and the partition definition table, such a data configuration is provided that using a name of "User" as a key, IDs of a policy set about this user, and said port 11, host group 18, LVOL, LDEV20, and disk unit group (ECC) 21 that are assigned are related with columns 500–506 respectively.

When having received a user account transmitted as involved in access from an information processing unit such as said host 25 (s401), said service processor 14 collates the received user account to an account table (FIG. 9) for checking. FIG. 9 shows one example of an account table 600. The account table 600 has such a data configuration that using said name of "User" as a key, a user ID and a password are related with columns 601–603. These user ID and password can be registered only by an upper user (supervisor).

The service processor 14 can recognize or identify the partition 50 that corresponds to this user, based on said collation. For example, if the user name is "odawara", a configuration of accessible resources will be such that ports "1A" and "2A" correspond to host groups "00" and "00" respectively, with the LDEVs being "00.00" through "00.03", and the disk unit group being "1—1".

On the other hand, when having received a partition creation instruction containing instruction information such as a port, a host group, an LVOL, or a policy from the user (s402), it collates a required specification of the logical unit 19 accepted from the information processing unit such as the host 25, with respect to an assignment policy for said logical device 19 and said disk unit group 21 that are defined for each of the users. FIG. 7 is an illustration for showing a system configuration (with a policy base resource assigning function) and a partition definition table. In this case, as shown in FIG. 7, said assignment policy is supposed to have been defined for each of the users in the managing configuration information 17.

Therefore, the managing configuration information 17 in the present embodiment has such a data configuration that using "User" as a key, the assignment policy, the port, the host group, the LVOL (virtual unit that corresponds to the required specification request), the LDEV, and the disk unit group are related with the columns 500–506. However, until the LVOL that corresponds to said use request is defined, said LDEV and said disk unit groups remain undefined.

The service processor 14 recognizes this policy based on said managing configuration information 17 (s403). If the user is, for example, "odawara", the relevant assignment policy is "independent" (written as "independent"). This "independent" policy provides a first policy that gives a provision to the effect that "a logical unit should be generated by selecting a logical device from a disk unit group to which no other partitions are assigned and in which no such disk unit group is present that control on input/output operations to disk units is conducted via the same adapter".

Further, as an example of the other policies, there is a second policy, that is, "partially shared" policy (hereafter referred to as "partial") that gives a provision to the effect that "a logical unit should be generated by selecting said logical device from a disk unit group to which no other partitions are assigned".

Furthermore, there is a third policy, that is, "shared use" policy (hereafter referred to as "shared") that gives a provision to the effect that "a logical unit should be generated by selecting said logical device from a disk unit group to which no other partitions corresponding to said first and second policies are assigned".

The service processor 14, which has recognized the assignment policy as described above, performs assignment of a logical device and a disk unit group that correspond to this policy (s404). Based on these selected logical device and disk unit group, it generates a logical unit (s405). Now that the logical unit has been thus generated and so the resource configuration of this user's partition has been updated, of course said managing configuration information 17 is also updated. That is, the process registers the resources in the partition definition table (s406) and ends the processing.

FIG. 5 is a flowchart for showing the initial partition definition flow (without policy) according to the present embodiment. Next, initial partitioning processing in response to a request from the user in the case of taking into account no policy is described. The service processor 14 is supposed to have recognized beforehand the logical and physical resources that constitute the subsystem 10. Information of this configuration is stored in the managing configuration information 17 beforehand (s500). This managing configuration information 17 provides a definition table in which the logical resources and the physical resources in the subsystem are assigned for each of the users at an interface level at which the storage configuration can be referenced by the storage management program, that is, an API level.

Figure 8:
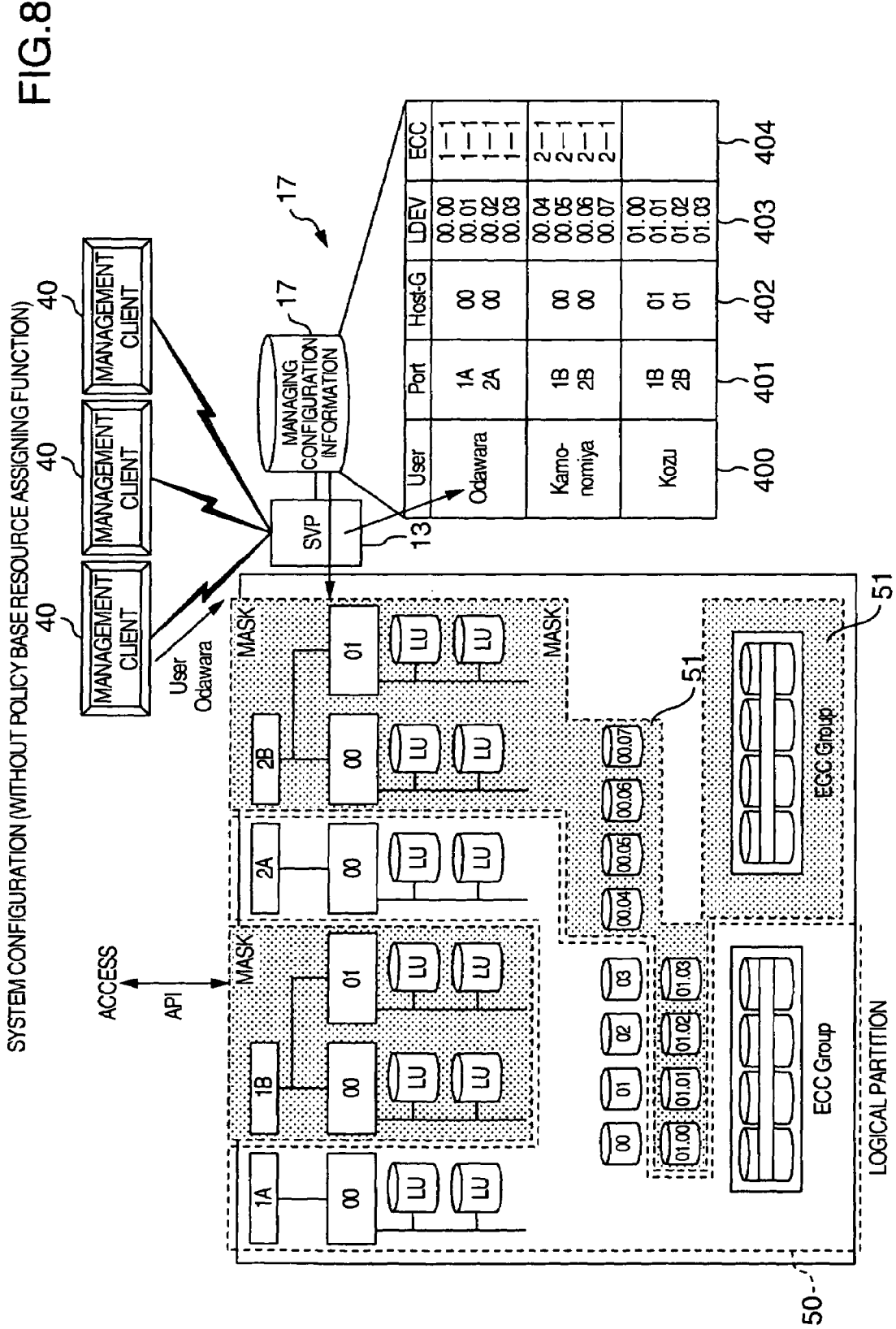
FIG. 8 is an illustration for showing the system configuration (without policy base resource assigning function) and the partition definition table.

In a partition definition table in FIG. 8 showing the system configuration (without policy base resource assigning function) and the partition definition table, such a data configuration is provided that using a name of "User" as a key, IDs of said port 11, host group 18, LDEV 20, and disk unit group (ECC) 21 that are assigned to this user are related to columns 400–404.

When having received a user account transmitted as involved in access from an information processing unit such as said host 25 (s501), said service processor 14 collates the received user account against the account table (see FIG. 9) the same way as described above.

The service processor 14 can recognize the partition 50 that corresponds to this user, based on said collation. For example, if the user name is "odawara", a configuration of accessible resources will be such that ports "1A" and "2A" correspond to host groups "00" and "00" respectively, with the LDEVs being "00.00" through "00.03", and the disk unit group being "1—1".

On the other hand, when having received a partition creation instruction containing instruction information such as a port, a host group, or an LVOL from the user (s502), it collates a required specification of the logical unit 19 accepted from the information processing unit such as the host 25 against a situation, contained in the managing configuration information 17, in which said logical device 19 and said disk unit group 21 are assigned to the other users. As shown in FIG. 8, said managing configuration information 17 has such a data configuration that using "User" as a key, the assigned port, host group, LDEV, and disk unit group are related with the columns 400–404.

Said service processor 14, which has recognized the resources that can be assigned to said user based on said managing configuration information 17, assigns a logical device and a disk unit group (s503). Based on these selected logical device and disk unit group, it generates a logical unit (s504). Now that the logical unit has been thus generated and so the resource configuration of this user's partition has been updated, of course said managing configuration information 17 is also updated.

That is, the process registers the resources in the partition definition table (s505) and ends the processing.

Next, resource configuration referencing/updating to be performed in response to a request from the user is described. FIG. 6 is a flowchart for showing a configuration referencing/updating flow according to the present embodiment. The service processor 14 is supposed to have recognized beforehand the logical and physical resources that constitute the subsystem 10 (s600). Information of this configuration is stored in the managing configuration information 17 as described above.

The service processor 14 accepts from an information processing unit such as said host 25 a user's login request involving a specification of a user ID and a password and goes through appropriate authentication processing, to perform login processing (s601). When having received a user account transmitted as involved in the login (s602), the service processor 14 collates it against an account table shown in FIG. 9 as described above.

The service processor 14 can recognize the partition 50 that corresponds to this user, based on said collation (s603). For example, if the user is "odawara", a configuration of accessible resources will be such that ports "1A" and "2A" correspond to host groups "00" and "00" respectively, with the host group being "00", the LDEVs being "00.00" through "00.03", and the disk unit group being "1—1" (see FIG. 7 or 8).

The service processor 14 outputs to said host 25 the logical resources and the physical resources that are contained in said recognized partition 50, as a resource configuration in the subsystem (s604). If, then, no changing request is sent from the host 25 (NO at s605), the processing ends. If a changing request is sent from the host 25 (YES at s605), on the other hand, it is accepted (s606). In this case, of course, the other partitions or changing requests from the other partitions are rejected.

The service processor 14, which has received said changing request, allows rewriting of the relevant logical resources or physical resources in said managing configuration information 17. Alternatively, it changes contents of the table in order to change the configuration in accordance with contents of the changing request (s607) and ends the processing.

It is to be noted that said service processor 14 can also output at a GUI level to said host 25 the logical resources and the physical resources that are contained in a partition 50 assigned for each user, as a resource configuration in the subsystem. It is to be noted that the resource configuration to be output at the GUI level is supposed to contain only such resources that a user's request for configuration changing/viewing can be accepted. Therefore, a request for changing/viewing about partitions of the other users or from the other partitions is rejected. Alternatively, such a configuration may be provided that only viewing is permitted but configuration changing is not accepted.

In said GUI output, such data may be assumed that a relationship among said resources is configured in a tree format. Further, a pattern of the GUI output may be any of a variety of applicable ones such as a pattern in which only the partition 50 of said user is displayed and the other partitions are masked, a pattern in which resources shared in the configuration, if any, are added to said partition 50 and displayed, and a pattern in which all the partitions are displayed but configuration changing of only the partition 50 is accepted.

Furthermore, displaying/masking of said configuration resources may be subject to output processing based on a policy in said managing configuration information 17, in such a manner that if, for example, the policy is "independent", only the configuration resources of the relevant user are displayed, that if the policy is "shared use", both the configuration resources of the relevant user and those of the other users are displayed, and that if it is "partially shared", engagement between the configuration resources of the relevant user and those shared by him and the other users is also displayed.

As described above, the subsystem logics partitioning and managing method according to the present invention is performed for managing, at an API level, access to a partition of interest from an information processing unit and changing of a configuration.

It is thus possible to release (some of) the configuration changing functions of the RAID while keeping security, for each of the partitions 50, that is, for each system or each user of an application. That is, said user can perform addition/changing of settings of resources within a range of volumes assigned by a storage manager.

Such an effect becomes more significant especially in a situation that storages of a plurality of systems are present in a mixed manner in one subsystem owing to storage consolidation, thereby providing a merit of integrated management due to storage consolidation without deteriorating convenience of each user.

Therefore, it is possible to provide a subsystem logics partitioning and managing apparatus, method, and program for enabling releasing configuration changing functions of the RAID within a predetermined range, and a recording medium for recording the program.

Although the present invention has been described with reference to its embodiments, the present invention is not limited to them but may be modified variously without departing from its gist in scope.

What claimed is:

1. A storage system, comprising:
   a disk array system comprising:
      a port receiving data sent from a first information processing device;
      a first controller transferring data received by said port;
      a memory storing data in accordance with transferring by said first controller;
      a second controller transferring data stored in said memory;
      a disk drive group storing data transferred by said second controller and having a plurality of disk drives;
      a logical unit being an address to which data is sent from said first information processing device and corresponding to a storage region in said disk drive group;
      a plurality of resource groups each having a plural kinds of resources among said port, a part or all of said first controller, a part or all of said memory, a part or all of said second controller, said disk drive group and said logical unit; and
      a second information processing device coupled to said disk array system and displaying first information of said plural kinds of resources in a first resource group of said resource groups and not displaying second information of said plural kinds of resources in a second resource group of said resource groups;
      wherein, in order to change configuration in a first resource group of said resource groups, said disk array system permits to change from a first state of relating between a first resource and a second resource in said first resource group into a second state of relating between said first resource and a third resource in said first resource group and does not permit to change from said first state into a third state of relating between said first resource and a fourth resource in said second resource group.

2. A storage system according to claim 1, wherein:
   said second information processing device is coupled to said first information processing device and requests to change said first state into said second state.

3. A storage system according to claim 1, further comprising:
   a managing device having information relating to said resource groups;

wherein said second information processing device is coupled to said managing device and requests to change said first state into said second state.

4. A storage system according to claim 1, wherein:
said first resource group, in accordance with a received request, is formed and is assigned a part of said plural kinds of resources; and
another part of said plural kinds of resources of said first resource group is automatically selected based on a predetermined policy and is not assigned to said second resource group.

5. A storage system according to claim 1, wherein:
said first resource group, in accordance with a request received from said first information processing device or said second information processing device, is formed and is assigned said plural kinds of resources.

6. A storage system according to claim 1, further comprising:
a plurality of first information processing device groups sending data to a plurality of said ports and including said first information processing device, and
wherein each of said resource groups has a second plurality of resources among said ports, said first information processing device groups, a part or all of said first controller, a part or all of said memory, a part or all of said second controller, said disk drive group and said logical unit.

7. A storage system according to claim 1, further comprising:
a plurality of physical resources including said port, said first controller, said memory, said second controller, or said disk drive group; and
a plurality of logical resources including said logical unit;
wherein said first resource is one of said physical resources, and
wherein said second resource and said third resource each are one of said logical resources.

8. A storage system according to claim 1, wherein, in order to change configuration of said second resource group,
said fourth resource is permitted to change from a fourth state of relating to a fifth resource in said second resource group into a fifth state of relating to sixth resource in said second resource group and is not permitted to change from said fourth state into a sixth state of relating to resources in said first resource group, and
wherein one or more resources in said first resource group are a different kind of resource from all of resources in said second resource group.

9. A storage system according to claim 1, wherein, in order to change configuration in said second resource group,
said fourth resource is changed from a fourth state of relating to a fifth resource in said second resource group into a fifth state of relating to sixth resource in said second resource group;
a seventh resource among said port, said first controller, said memory, said second controller, said disk drive group and said logical unit in said disk array system does not belong to either of said first resource group and said second resource group.

10. A storage system according to claim 1, wherein:
said first resource and said second resource are used to transfer data sent from said first information processing device to a first storage region in said disk drive group in said first resource group; and
said first resource and said third resource are used to transfer data sent from said first information processing device to said first storage region or a second storage region in said disk drive group in said first resource group.

11. A storage system according to claim 1, further comprising:
a plurality of first information processing devices sending data to a plurality of said ports and including said first information processing device;
wherein one of said first information processing devices can be allowed to access data in a first storage region in said disk drive group in said first resource group and not allowed to access data in a second storage region in said disk drive group in said first resource group, and
wherein another of said first information processing devices can be allowed to access data in said second storage region and not allowed to access data in said first storage region.

12. A storage system, comprising:
a disk array system comprising:
a port receiving data from an first information processing device;
a logical unit provided for said first information processing device and relating to a storage region;
a RAID (Redundant Array of Independent Disks) group relating to a plurality of disk drives, said disk drives storing a plurality of data and a parity data related to data sent from said first information processing device and relating to said storage region;
a plurality of logical resources having said port, said logical unit and said RAID group;
a plurality of physical resources having said disk drives;
a plurality of resource groups each having one or more of said logical resources and one or more of said physical resources;
one or more first resources belonging to a first resource group and a second resource group of said resource groups; and
a second information processing device coupled to said disk array system and displaying first information of said one or more of said logical resources in said first resource group and second information of said one or more first resources;
wherein, in order to change configuration in said first resource group, said disk array system allows to change a first state of relating between a second resource and a third resource in said first resource group into a second state of relating between said second resource and a fourth resource in said first resource group and does not allow to change said first state into a third state of relating between said second resource and a fifth resource in a second resource group of said resource groups.

13. A storage system, comprising:
a disk array system comprising:
a port receiving data from a first information processing device;
a plurality of logical units being provided for said first information processing device and relating to a plurality of storage regions;
a plurality of disk drives having said storage regions;
a plurality of ECC (Error Check and Correct) groups relating to said disk drives and each of said ECC groups storing a plurality of data and a parity data related to data sent from said first information processing device;

a first plurality of resources having a plurality of said ports, said logical units, said disk drives and said ECC groups;

a second plurality of resources having plural types of resources in said first plurality of resources;

a plurality of resource groups each having said second plurality of resources;

a second information processing device coupled to said disk array system and displaying information of said second plurality of resources of said resource groups, whereby a relationship between said second plurality of resources in a first resource group of said resource groups can be changed independently of another one of said resource groups; and a first resource of said first resource group being permitted to change from a first state of relating between said first resource and a second resource in said first resource group into a second state of relating between said first resource and a third resource in said first resource group and being not permitted to change a third state of relating between a fourth resource and a fifth resource in said first resource group into a fourth state of relating between said fourth resource and a sixth resource in said another one of said resource groups.

14. A storage system, comprising:

a disk array system comprising:

a plurality of ports each receiving data from a first information processing device;

a plurality of logical units being provided for said first information processing device and relating to a plurality of storage regions;

a plurality of disk drives having said storage regions;

a plurality of ECC (Error Check and Correct) groups relating to said disk drives and each of said ECC groups storing a plurality of data and a parity data related to data sent from said first information processing device;

a first plurality of resources having said plurality of ports, said logical units, said disk drives and said ECC groups;

a second plurality of resources having plural types of resources in said first plurality of resources;

a plurality of resource groups each having said second plurality of resources;

a second information processing device coupled to said disk array system and displaying information of said second plurality of resources of said resource groups, whereby a relationship between said second plurality of resources in a first resource group of said resource groups can be changed independently of another one of said resource groups; and a first resource of said first resource group being permitted to change from a first state of relating between said first resource and a second resource in said first resource group into a second state of relating between said first resource and a third resource in said first resource group and being not permitted to change a third state of relating between a fourth resource and a fifth resource in said first resource group into a fourth state of relating between said fourth resource and a sixth resource in said another one of said resource groups.

15. A storage system, comprising:

a disk array system comprising:

a port receiving data sent from a first information processing device;

a logical unit provided for said first information processing device to store data and relating to a storage region;

a plurality of disk drives having said storage region;

a RAID (Redundant Array of Independent Disks) group relating to said disk drives, said disk drives storing a plurality of data and a parity data related to data sent from said first information processing device; and a plurality of resource groups each having a plural types of resources among said port, said logical unit, said disk drives and said RAID group and each resource group being mutually partitioned by a logical partition; and a second information processing device coupled to said disk array system and displaying first information of said plurality of resources in a first resource group of said resource groups and not displaying second information of said plurality of resources in another resource group of said resource groups, wherein, if said second information processing device changes configuration in said first resource group, said first resource group is permitted to change a relationship between said plural types of resources in said first resource group and is not permitted to change a relationship between one resource in said first resource group and another resource in another resource group.

16. A storage system, comprising:

a disk array system comprising:

a port receiving data from one or more information processing devices;

a controller transferring data received by said port;

a memory storing information which is used to control;

a plurality of disk drives storing data transferred and having a plurality of storage regions; and a plurality of resource groups each being mutually partitioned by a logical partition and each resource group having said ports, a part of logical parts corresponding to said controller, a part of logical parts corresponding to said memory and said disk drives;

wherein each of said resource groups can be related to at least one said information processing device;

wherein a first of said information processing devices related to a first resource group of said resource groups can access resources in said first resource group and cannot access resources in a second resource group of said resource groups; and wherein said first information processing device can display information related to resources in said first resource group.

17. A storage system, comprising:

a disk array system comprising:

a port receiving data from one or more information processing devices;

a controller transferring data received by said port;

a memory storing data received by said port;

a plurality of disk drives storing data transferred and having a plurality of storage regions; and a plurality of resource groups each being mutually partitioned by a logical partition and each resource group having said ports, a part of logical parts corresponding to said controller, a part of logical parts corresponding to said memory and said disk drives;

wherein each of said resource groups can be related to at least one said information processing device, wherein a first of said information processing devices related to a first resource group of said resource groups can access resources in said first resource group and cannot access resources in a second resource group of said resource groups; and wherein said first information processing device can display information related to resources in said first resource group.

* * * * *